United States Patent [19]

Davis

[11] 4,022,706
[45] * May 10, 1977

[54] CHOLESTERIC LIQUID CRYSTAL WATER BASE INK AND LAMINATES FORMED THEREFROM

[75] Inventor: Frederick Davis, Dublin, Calif.

[73] Assignee: Robert Parker Research, Inc., Dublin, Calif.

[*] Notice: The portion of the term of this patent subsequent to July 13, 1993, has been disclaimed.

[22] Filed: Oct. 31, 1974

[21] Appl. No.: 519,480

Related U.S. Application Data

[63] Continuation-in-part of Ser. No. 425,006, Dec. 17, 1973, Pat. No. 3,969,264.

[52] U.S. Cl. ............................ 252/299; 23/230 LC; 73/356; 350/160 LC; 428/1
[51] Int. Cl.² ................... G01K 11/16; C09K 3/34
[58] Field of Search ..................... 252/299, 408; 23/230 LC; 73/356; 428/1

[56] References Cited

UNITED STATES PATENTS

| | | | |
|---|---|---|---|
| 3,600,060 | 8/1971 | Churchill et al. | 350/160 LC |
| 3,617,374 | 11/1971 | Hodson et al. | 73/356 |
| 3,620,889 | 11/1971 | Baltzer | 252/408 |
| 3,655,971 | 4/1972 | Haas et al. | 252/299 |
| 3,669,729 | 6/1972 | Seiner | 428/307 |
| 3,969,264 | 7/1976 | Davis | 252/299 |

FOREIGN PATENTS OR APPLICATIONS

| | | | |
|---|---|---|---|
| 1,161,039 | 8/1969 | United Kingdom | 252/299 |

Primary Examiner—Benjamin R. Padgett
Assistant Examiner—T. S. Gron
Attorney, Agent, or Firm—Townsend and Townsend

[57] ABSTRACT

Thin stable, substantially uniform, liquid crystal containing films are provided by coating a liquid crystal containing ink onto an inert substrate, which may be transparent, or opaque, optionally pigmented, particularly black pigment. The liquid crystal ink comprises an oil in water latex, where the latex contains a film forming polymer, a minor amount of an organic solvent for the liquid crystals, particularly a moderately water soluble organic solvent, which may be an individual solvent or a combination of solvents, the liquid crystals, and normally a thickening agent. The liquid crystal ink may be coated onto a wide variety of substrates and may then be coated with a protective coating or a dark backing. The laminated products can be used as ornamental articles of manufacture, for photographic reproduction, for temperature determination, and the like. The films are employed as substrates and/or protective coatings, and can be dimensionally stable films, vacuum forming films, mold forming films, and the like.

18 Claims, 3 Drawing Figures

U.S. Patent    May 10, 1977    4,022,706
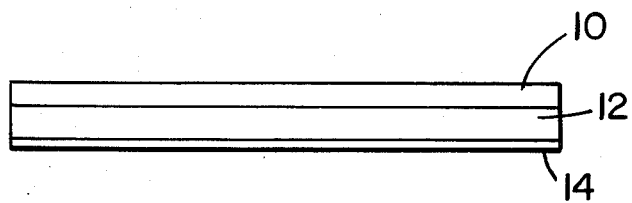
FIG_1
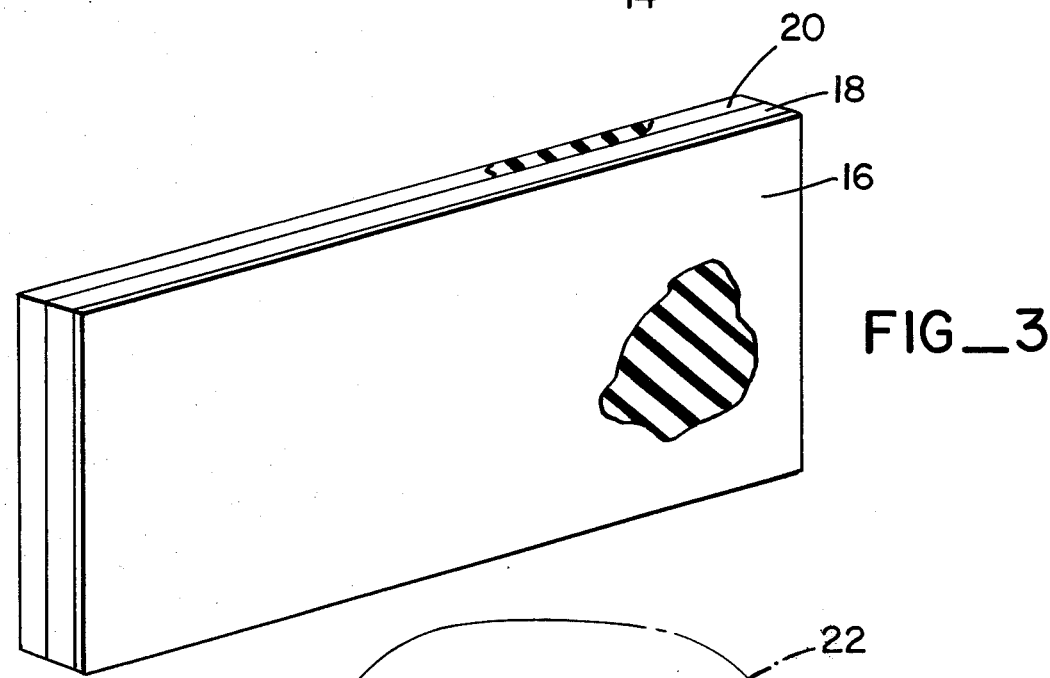
FIG_3
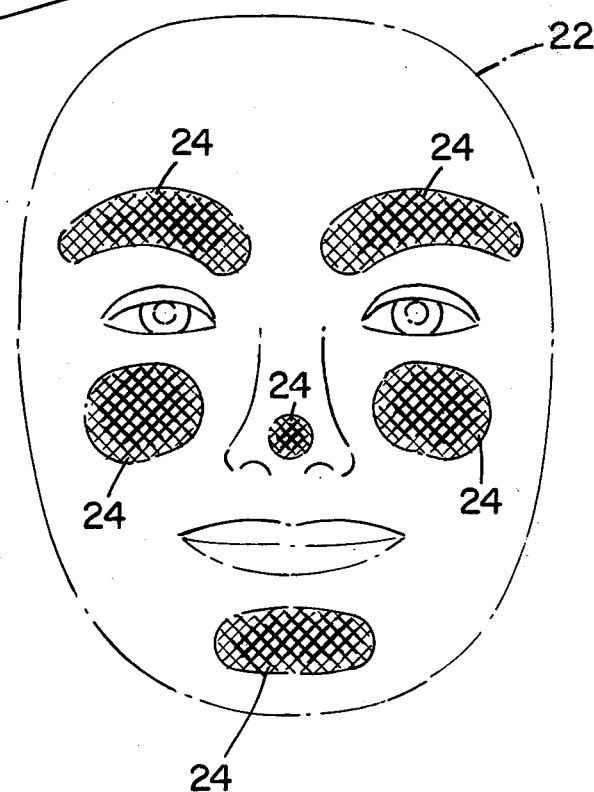
FIG_2

CHOLESTERIC LIQUID CRYSTAL WATER BASE INK AND LAMINATES FORMED THEREFROM

CROSS-REFERENCE TO RELATED APPLICATIONS

This application is a continuation-in-part of application Ser. No. 425,006, filed Dec. 17, 1973, now U.S. Pat. No. 3,969,264.

BACKGROUND OF THE INVENTION

1. Field of the Invention

Cholesteric liquid crystals exhibit brilliant iridescent colors when exposed to various environmental changes such as temperature, pressure, electric fields or contaminants. The response of the liquid crystals can be varied in a variety of ways, including the addition of other materials.

The cholesteric liquid crystals are for the most part, greasy buttery substances, which remain soft and difficult to handle and coat. Their use is therefore severely limited, unless means are provided to enhance the ease of handling. Several methods have been developed, which either encapsulate or emulsify the liquid crystals into a system, which is convenient to handle.

The encapsulation technique coats small droplets of liquid crystals with a protective shell, particularly with water soluble polymeric materials. The coating, while protecting the liquid crystals and enhancing the ease of handling, severely reduces the intensity of the color. The texture and thickness requirements of the encapsulated materials makes mass production difficult, and the encapsulated liquid particles cannot be readily silk screened or printed.

By strongly agitating liquid crystals in a latex, the liquid crystals can be dispersed as small droplets. The percentage of liquid crystals, which are capable of handling in this manner, is small and the color of the finished film poor. Furthermore, the emulsion would tend to break down in time, with the liquid crystals floating to the surface.

The various colors, which the cholesteric materials undergo in their temperature responsive range, are naturally brilliant. However, when the cholesteric materials are combined with other materials or are coated, the colors can undergo substantial dulling. Therefore, it is important when combining the liquid crystal compositions with other materials which serve to fix the liquid crystals to a surface and provide protection for the liquid crystals, that the medium be relatively inert and be clear, as well as capable of bonding to additional films or coatings.

2. Description of the Prior Art

U.S. Pat. Nos. 3,697,297 and 3,732,119 disclose methods of encapsulation of liquid crystals. U.S. Pat. No. 3,600,060 uses water soluble film forming polymers and emulsifies liquid crystals in an aqueous medium. U.S. Pat. No. 3,620,889 incorporates liquid crystals in a clear plastic resin from a solution of the resin in an aromatic hydrocarbon solvent. U.S. Pat. Nos. 3,655,971, 3,663,390, and 3,666,948 use various forms of electromagnetic radiation to form images on films of liquid crystal compositions.

SUMMARY OF THE INVENTION

A liquid crystal ink is provided, which can be formulated to provide moderately to nongreasy surfaces, having bright colors and good adherence to a wide variety of films. The liquid crystal film is relatively free of migration of the liquid crystals and can be used to provide laminates having a substrate film and backing film, which are stable for long periods of time, without separation or release of one film from another.

The liquid crystal ink employs an oil in water latex, usually employing an addition polymer, which is a good film former. The liquid crystals are combined with the oil in water latex in combination with a small amount of an organic solvent, normally a polar oxygenated solvent having at least a moderate vapor pressure at room temperature and capable of dissolving the liquid crystals. Normally, a thickening agent will also be included in the composition, as well as other minor additives.

BRIEF DESCRIPTION OF THE DRAWINGS

FIG. 1 is a cross-sectional view of a laminate;
FIG. 2 is a perspective view of a mask made from a laminate of this invention; and
FIG. 3 is a perspective view of a rubber laminate according to this invention.

DESCRIPTION OF THE SPECIFIC EMBODIMENTS

Novel film laminates are provided having as an intermediate film, a liquid crystal film composition derived from a liquid crystal ink. The laminate will have at least three layers and may have four or more depending upon the particular application. The liquid crystal film has as its major ingredients liquid crystals and a film forming polymer, normally an addition polymer, capable of forming a stable oil in water latex, and minor amounts of a thickening agent, as well as other minor additives. The film is believed to be a matrix of liquid crystal particles distributed relatively discontinuously in the film forming polymer. The liquid crystal film of this invention is found to have bright colors, substantially reduced greasiness from the liquid crystal composition itself, and little, if any, migration of the liquid crystal composition. In addition, the liquid crystal film has excellent adherence to a wide variety of other organic and inorganic films.

The liquid crystal inks employed for preparing the films have a number of advantages, besides producing excellent quality liquid crystal films. The inks are easily coated to a uniform coating, substantially free of flaws, such as bubbles. Foaming and bubble formation during coating, such as silk screening, is minimized. The compositions are easily formulated, easily handled, and are readily coated with a wide variety of conventional equipment. In addition, the inks can be formed into sharply delineated patterns.

The compositions of this invention can be readily prepared by employing commercially available latex compositions. The latex composition may be diluted with water or concentrated to the desired solids content. The latex solution is employed at ambient or moderately elevated temperatures, normally below 40° C.

A second solution is formed which contains the liquid crystal composition. This solution employs the liquid crystal composition, an organic solvent for the liquid crystal composition, normally a moderately water soluble polar solvent, an organic thickening agent, and optionally, a wetting agent. Alternatively, the thickening agent can be added to the combined latex and solution of liquid crystals. The wetting agent may be added to the latex or the second solution prior to mixing.

The weight ratio of the second solution added to the latex solution will normally have from 20 to 80 weight percent solids, usually 30 to 70 weight percent solids.

The liquid crystal containing mixture is heated to a temperature of at least 40° C and less than about 100° C, usually less than 90° C, and preferably less than about 85° C, providing a substantially homogeneous solution of the liquid crystals. All of the materials present need not be dissolved. The range of choice will generally be about 50°–80° C depending on the particular composition employed, the boiling point of the organic solvent, and the like. It is found, that the properties of the final composition will vary depending on the temperature employed. Therefore, to optimize the properties of the final product, some experimentation may be required within the ranges indicated above.

The liquid crystal containing solution is then added to the latex, which is conveniently at ambient temperature, with moderate stirring and without further heating. The liquid crystal composition is added slowly and stirring is continued for a short time, usually of the order of 5 to 30 minutes, although longer times may be employed if desired. Stirring will generally be of the order of 200 to 3,000 r.p.m.

The resulting composition may now be used for preparing films, for printing, or the like. Various techniques may be used, such as rollers, spraying, draw down blade, silk screening, rotogravure, or the like. The resulting coatings are found to dry rapidly, are substantially free of discontinuities as a result of bubbles, have bright colors in the temperature response range of the liquid crystals, and have only a mildly greasy or nongreasy feel to the touch.

The coating composition of this invention will normally have at least about 30 weight percent solids, and less than about 80 weight percent solids, usually having from about 35–60 weight percent solids, and more usually from about 35–50 weight percent solids. Correspondingly, the total liquids will be less than about 70 weight percent, and more than about 20 weight percent, usually in the range of 40–65 weight percent, and more usually in the range of 50–65 weight percent. The major portion of the solids content will be from the organic polymer in the latex and the liquid crystal composition. Normally, the liquid crystals will be at least about 25 weight percent, and not more than about 80 weight percent of the solids content, usually not more than 75 weight percent, usually being in the range of about 40–75 weight percent, and more usually in the range of about 50–75 weight percent. Correspondingly, the organic polymer will be at least about 20 weight percent, and not more than about 75 weight percent, usually greater than about 25 weight percent, usually being in the range of about 25–60 weight percent, and more usually in the range of 25–50 weight percent.

In order to have a satisfactory product, it is desirable that the weight ratio of polymer to liquid crystal composition be within relatively narrow limits. If the amount of liquid crystal composition is too low, then the film color in the mesophase will generally be poor. Alternatively, if too high an amount of liquid crystal is employed, the film will be greasy, will only be difficulty bonded to other films, and the emulsion formed upon the combining of the latex and liquid crystal solution, may be unstable and break. Usually, the weight ratio of polymer to liquid crystal composition will be of from about 1:1–3, preferably 1:1.5–3.0.

For the liquid content, the water will normally be present in at least about 40 weight percent, generally being in the range of about 45–75 weight percent, and more usually in the range of about 50–70 weight percent. Correspondingly, the organic solvent will usually be not more than about 60 weight percent, generally being in the range of about 25–55 weight percent, and more usually in the range of about 30–50 weight percent of the total liquids content.

The remaining material which is present is the thickening agent, which is added in sufficient amount to provide a mayonnaise-like consistency. The viscosity of the final composition at 20° C will generally be greater than about 1,000 centipoise, usually greater than 1,500 centipoise. The maximum amount of thickening agent is determined by the desired consistency for a particular application of the ink.

A wide variety of anionic and nonionic latexes may be employed. The latexes are normally derived from organic addition polymers, normally having molecular weights in the range of about $10^4$ to $10^6$ viscosity average molecular weight. The addition polymers may be derived from acrylics, which include acrylic acid, methacrylic acid, their esters, normally alkyl groups of from 1 to 18 carbon atoms as the alkanolic portion, hydroxylated alkyl of from 1 to 6 carbon atoms, e.g. hydroxyethyl, chlorovinyl polymers, e.g. vinyl chloride and vinylidene chloride, vinyl acetate, acrylonitrile, styrene, vinyl pyrrolidone, and the like. Of particular interest are the acrylic latexes, substantially free of monomers other than acrylate and methacrylate esters, vinyl chloride, vinylidene chloride, and copolymers with up to 30 number percent of one of the other monomers indicated previously. The polymers provide transparent films.

Preferred latexes are the acrylic emulsion latexes, obtained from alkyl acrylates having alkyl groups of from 1 to 18 carbon atoms, more usually of from 1 to 6 carbon atoms, and particularly of from 1 to 4 carbon atoms, having at least 60 mole percent, more usually at least 80 mole percent of monomers, where the alkyl group of the alkyl acrylate is of from 1 to 4 carbon atoms.

The polymers may be noncrosslinking, crosslinking upon addition of a crosslinking agent, or curable upon heating, either in the absence of or addition of a particular catalyst. Where curable resins are employed, frequently, small amounts of monomers, generally less than 5 mole percent, and at least about 0.1 mole percent, more usually from about 0.5 to 2 mole percent will be present, which have active groups such as glycidyl acrylate, aziridinylmethyl acrylate, or the like.

The latexes employed will generally have from about 15 to 70 weight percent polymer, more usually from about 35–65 weight percent polymer, and from about 30–85 weight percent water, more usually from about 35–70 weight percent water. The viscosity of the latex will generally be in the range of from about 10 to 10,000 cps (measured at 25° C on a Brookfield viscomoter), preferably from about 50 to about 3,000 cps.

Various conventional emulsifiers may be present in the latex. Anionic emulsifiers may be employed, such as fatty acid carboxylates, alkylbenzene sulfonates, alkyl phosphates, and the like, as well as nonionic emulsifiers, such as alkylphenyl polyoxyethylenes, polyoxyethylated fatty alcohols, and the like, either individually or together. The amount of emulsifier will generally be from about 0.1 to 5 weight percent of the latex composition.

Nonencapsulated conventional cholesteric liquid crystals will be employed, either individually or in combination. Common cholesteric liquid crystal compounds include cholesteryl chloride, cholesteryl bromide, cholesteryl acetate, cholesteryl oleate, cholesteryl caprylate, cholesteryl oleyl carbonate, and the like. See U.S. Pat. No. 3,600,060 for a description of the cholesteric liquid crystals and a listing thereof, which description is incorporated herein by reference.

The solvents which are employed will generally have a boiling point below about 175° C, preferably below about 120° C, and particularly preferred below about 100° C, and greater than about 50° C. Both polar and nonpolar solvents may be employed, with the polar solvents being preferred, and of these solvents, particularly the oxygenated solvents. Various solvents include hydrocarbons, halohydrocarbons, particularly aromatic chlorocarbons, such as chlorobenzene and trichlorobenzene, nitriles, and oxygenated solvents. The non-oxygenated solvents will normally not be used by themselves, but may be used in combination with other solvents.

The preferred solvents are polar organic solvents, normally oxygenated of from 3 to 8 carbon atoms and from one to two oxygen atoms. The solvents may be alcohols, ketones, esters, or ethers, preferably of from 4 to 8 carbon atoms, and particularly preferred, methyl ethyl ketone. The oxygenated solvents will normally be soluble in water to at least about 0.5 weight percent at 20° C, and while the solvents may be miscible with water, preferred solvents will have a solubility at 20° C of less than about 50 weight percent, more preferably, less than about 40 weight percent based on the total solution. Illustrative oxygenated solvents include isobutanol, methyl ethyl ketone, ethyl acetate, butyl acetate, amyl acetate, methyl isobutyl ketone, and the like. A sufficient amount of solvent is employed to insure the complete dissolution of the liquid crystal composition.

Advantageously, mixed solvents may be used with a major proportion of the more volatile solvent and a minor proportion of the less volatile solvent. The major proportion of the more volatile solvent will generally be of from about 55–90 volume percent, and correspondingly, there will be from 10–45 volume percent of the higher boiling solvent. For example, mixtures of methyl ethyl ketone and methyl isobutyl ketone can be employed. Another mixture is methyl ethyl ketone and amyl acetate. The particular choice of solvent will depend to some degree on the manner in which the ink is employed. For example, where silk screening is used, it is frequently desirable to have a small amount of a higher boiling solvent boiling in the range of about 100° to 175° C, with the lower boiling solvent boiling in the range of about 50° to 100° C.

The solvent plays a crucial role in the subject invention. The solvent mixture must be able to dissolve the liquid crystals. The solvent must not break the latex emulsion when added to the emulsion. In addition, the solvent should have a sufficient vapor pressure than when the film is formed from the liquid crystal ink, the solvent does not contaminate the ink so as to substantially reduce the temperature range of the liquid crystal composition, nor should it degrade the color of the liquid crystal composition in its mesophase.

The thickening agent may be varied widely and is normally employed in a sufficient amount to insure the desired consistency of the composition for use in coating or film forming. The thickening agent will normally be present in at least about 0.1 weight percent, usually at least about 0.2 weight percent, and not more than about 2 weight percent, more usually from about 0.5 to 1.5 weight percent of the total coating composition. Various thickening agents can be employed, such as the carboxylvinyl polymers and the salts thereof, e.g. sodium, sold as Carbopol resins by B. F. Goodrich Chemical Co., e.g. Carbopols 934, 940, 941, 960 and 961, salts of carboxymethylcellulose, e.g. sodium, salts of polyacrylic acid, e.g. sodium, sold as K718 by B. F. Goodrich Co., polyethylene oxides, alkyl (1 to 3 carbon atoms) and hydroxyalkyl (2 to 3 carbon atoms) cellulose, e.g. methyl cellulose and hydroxyethyl cellulose, 2-aminomethylpropanol, and the like.

Wetting agents may also be included in minor amounts, particularly nonionic or anionic emulsifiers. The nonionic emulsifiers are primarily ethylene oxide and propylene oxide polymers where the end groups may be esterified or etherified. Various series of nonionic wetting agents are available under the name Emulphor, Triton, and the like. Other wetting agents include polyols, e.g. 2,4,7,9-tetramethyl-5-decyn-4,7-diol (Surfynol 104, sold by Air Products and Chemical Co.)

The wetting agent will normally be employed in small amounts, generally being present in from about 0.1 to 2 weight percent of the total composition, more usually of from about 0.2 to 1 weight percent of the total composition. Since the wetting agent will be in addition to the emulsifier employed for the latex, the total amount of emulsifier may range up to about 4 weight percent of the total composition.

The inks prepared in accordance with the subject invention have bright colors, good adherence to a wide variety of films, are readily silk screened to sharply define pictorial and alpha-numeric representations, and can be stretched on a stretchable substrate or formable substrate, so as to form laminates, which may have a wide variety of uses.

The laminates of this invention will normally have a stable, inert, film, which will usually be preformed. Illustrative films include polyester condensation polymers, such as polyethylene terephthalate and polycarbonate, addition polymers, such as ABS polymers (acrylonitrile-butadienestyrene), acrylate and methacrylate films, polyvinylidene chloride films, polyvinyl chloride films, fluorocarbons, e.g. Kel-F, and polyvinyl fluoride, polyolefins films, e.g. polyethylene, polypropylene, etc., cellulose esters, e.g. cellulose acetate, propionate and butyrate, ethylene-vinyl acetate, vinyl chloride-vinyl acetate, polyamides, e.g. nylon and polycaprolactam, polystyrene, and copolymers thereof, particularly vinyl chloride-vinylidene chloride, and the like.

The films may vary in thickness from about 0.25 to 30 mils, more usually being from about 2 to 15 mils, and frequently being from about 3 to 10 mils. Depending upon the particular function of the substrate film, the film may be transparent, colored, or have a black pigment. Conveniently, the preformed film, which acts as a substrate, can be the transparent film, the liquid crystal film having one transparent film to which it is directly bonded and is either directly or indirectly bonded through one or more films, which provide a black background.

Substantially uniformly coated onto the substrate may be one or a plurality of liquid crystal composition films having thicknesses in the range of about 0.5 to 20 mils, more usually from about 1 to 15 mils, and frequently from about 1 to 12 mils. The liquid crystal composition film may have stripes, pictorial representations, or the like, and while substantially uniform in thickness, may be discontinuous or continuous.

After coating onto the substrate, the liquid crystal film may be coated or covered with one or more layers of either preformed films or paints or combinations thereof, which may be transparent or pigmented, particularly black pigmented. Conveniently, a black pigmented ink or paint of from about 0.5 to 5 mil thickness is coated onto a liquid crystal layer. Various paints may be employed, such as acrylates, as latexes, which may be active, semi-reactive or reactive, vinyl chloride polymers and copolymers, vinylidene chloride polymers and copolymers, vinyl acetate polymers and copolymers, cellulose esters, and the like. These polymers are compatible with and will form strong bonds with the liquid crystal film. If additional films are not employed or the paint or ink is to serve as the sole protective coating, then thicknesses of from about 2 to 20 mils, more usually from about 3 to 15 mils will be employed.

Besides organic films, metal foils may also be employed, where the metal foil may act as the base film upon which is coated the liquid crystal film or may be adhered to the prior formed liquid crystal film. Where the metal foil is directly bonded to the liquid crystal film, the bonding surface should be blackened, e.g. anodized. Usually, there will be a black paint or ink coating between the liquid crystal film and the metal film. Various metal films may be employed, such as aluminum, magnesium, etc.

The compositions of this invention are particularly useful in blow molded films and vacuum formed films where stretching of the film may be required or modeling to provide a particular shape or structure. For example, laminates employing the composition of the subject invention can be blow molded or vacuum formed into masks, so that the temperature response of the liquid crystal composition will give a variegated appearance. Decorative plastic containers can be prepared, as well as objet d'art, wrappings, ribbons, or the like.

In FIG. 1, a laminate cross section is depicted having a transparent film 10, a liquid crystal film 12, and a dark backing 14.

In FIG. 3, a laminated flexible elastomeric sheet is depicted, having a transparent layer 16, made of an elastomeric transparent polymer, such as ethylene-propylene rubber, a liquid crystal film prepared in accordance with this invention, and a black pigmented polymer backing 20, which can be made of any convenient elastomer, such as polyurethane, SBR, nitrile rubber, or the like.

In FIG. 2, a mask 22 is depicted, which is blow molded from a laminated film, so that when held against the face, it will undergo a variety of color changes 24, depending on the distance from the skin and the temperature and mesophase range of the liquid crystal film.

EXPERIMENTAL (All temperatures not otherwise indicated are in Centigrade.)

The following examples are offered by way of illustration and not by way of limitation.

A general method was employed for preparing the subject compositions. A commercially available latex was diluted, as required, with water to the desired solids content. In a separate container was introduced a polar organic solvent, a liquid crystal composition, a thickening agent and when employed, the wetting agent. The liquid crystal composition was then heated to an elevated temperature, 50°–70° C, and added slowly with stirring to the latex solution. Stirring was continued for at least five minutes after the addition of the liquid crystal composition appeared ready for use with a thick mayonnaise-like consistency.

The composition was then drawn down with a knife blade or silk screened to give a thin dry film upon evaporation of the liquid, having a thickness of about 1–5-mils. After drying, the film was visually inspected for its appearance, touched to determine its greasy character, and warmed to the temperature response range of the liquid crystals to determine the appearance of the liquid crystals. The following table indicates the various compositions prepared and the observations made concerning these films.

| Latex[1] | H$_2$O | Liquid Crystals[2] | Solvent[8] | | Thickening Agent[3] | | Wetting Agent[4] | | Film Thickness mils | Film Forming Method[5] | Composition Viscosity[6] | Color[6] | Greasiness[6] | Other[7] |
|---|---|---|---|---|---|---|---|---|---|---|---|---|---|---|
| | g* | g | g | | g | | | g | | | | | | |
| AC-61 | 40 | — | 16 | MEK | 12 | QP | 0.125 0.4- | E | 0.7 | 5 | DD | G | G | G | |
| AC-61 | 20 | 30 | 30 | MEK | 10 | QP | 0.8 | E | 1.0 | 1–2 | DD | G | G | G | |
| AC-61 | 16 | 24 | 20 | MEK | 20 | C-961 | 0.4 | — | — | 1–2 | SS | G | G | G | |
| AC-61 | 30 | 20 | 20 | MEK | 20 | C-961 G-110 | — 0.5 | — | — | 1–2 | SS | G | G | G | |
| AC-73 | 24 | 16.5 | 20 | MEK | 20 | C-961 | 0.4 | E | 0.5 | 1–2 | DD | — | G | G | melted |
| XD7506 | 24 | 16 | 20 | MEK | 20 | C-961 | 0.4 | E | 0.4 | 1–2 | DD | G | VG | F | |
| LC-40 | 24 | 16 | 20 | MEK | 20 | C-961 | 0.4 | E | 0.4 | 1–2 | DD | G | G | F | |
| N-495 | 24 | 16 | 20 | MEK | 20 | C-961 | 0.4 | E | 0.4 | 1–2 | DD | G | VG | P | |
| HA-16 | 24 | 16 | 20 | MEK | 20 | C-961 | 0.4 | E | 0.4 | 1–2 | DD | G | G | G | melted |
| E-801N | 24 | 16 | 20 MEK | 20 | C-96 | 0.4 | E | 0.4 | 1–2 | DD | G | E | P | | |
| AC-61 | 24 | 16 | 20 | S—C$_4$OH | 30 | C-961 | 0.4 | CF-10 | 0.5 | | DD | G | VG | F | |
| C514H | 24 | 16 | 20 | MEK | 20 | C-961 | 0.4 | CF-10 | 0.5 | | DD | G | VG | E | |
| AC-61 | 24 | 16 | 20 | MEK | 20 | C-961 | 0.25 | S-25 | 0.5 | | DD | G | G | F | |
| AC-61 | 24 | 16 | 20 | MEK AmAc | 18 2 | C-961 | 0.4 | CF-10 | 0.5 | | SS | G | E | F | |
| AC-61 | 24 | 16 | 20 | MEK AmAc | 16 4 | C-961 | 0.4 | CF-10 | 0.5 | | DD | G | E | F | |
| GVL460X1 | 24 | 16 | 20 | MEK | 20 | C-961 | 0.4 | E | 0.4 | | DD | G | G | F | |
| AC-61 | 24 | 16 | 20 | MEK | 20 | C-961 | 0.4 | S-104 | 0.4 | | DD | G | G | E | |

-continued

| Latex[1] | H₂O g | Liquid Crys- tals[2] g | Solvent[8] | Thickening Agent[3] g | Wetting Agent[4] g | Film Thick- ness mils | Film Forming Method[5] | Compo- sition Viscosity[6] | Color[6] | Greas- iness[6] | Other[7] |
|---|---|---|---|---|---|---|---|---|---|---|---|
| AC-61 24 | 36 | 20 | MEK 20 | C-961 1.0 | CF-10 0.5 | | DD | G | VG | VG | |

*Approximately 50 weight percent solids except as indicated otherwise

1.  AC-61 — Anionic Acrylic Polymer Emulsion 46.5 weight % solids; sp. gr. 20° C 1.13 vis. 20 – 135 cps; 25° C., No. 1 Spindle 30 rpm Brookfield viscometer; supplied by Rohm & Haas Co., Phila., Pa.
    AC-73 — Nonionic Acrylic Polymer (hard) Emulsion Rohm & Haas Co.
    XD7506 — Polyvinylidene Chloride Emulsion (high barrier) Dow Chemical Co.
    LC-40 — Anionic Acrylic Polymer Emulsion Rohm & Haas Co.
    N-495 — Anionic Acrylic Ester Copolymer Emulsion, Rohm & Haas Co.
    HA-16 — Nonionic Self Cross-linking Acrylic Polymer Emulsion, Rohm & Haas Co.
    E-801N — Nonionic Acrylic/Vinylidene Chloride Copolymer Emulsion, Rohm & Haas Co.
    C-514H — 40% Solids Thermoplastic Acrylic Dispersion, B. F. Goodrich Co.
    GVL460X1 — Thermosetting Anionic Vinyl Chloride Copolymer Emulsion, B. F. Goodrich Co.
2.  An exemplary composition which was employed was:
    weight percent
    40 cholesteryl oleyl carbonate
    20 cholesteryl benzoate
    40 cholesteryl nonanoate
3.  QP — QP 52,000 - Cellosize, Hydroxyethyl cellulose Union Carbide and Chemical Co.
    C-961 — Carbopol 961, Carboxyvinyl Polymer B. F. Goodrich Chemical Co.
    G-110 — Ammonium polyacrylate, 22 weight % solids
4.  E — Emulphor ON870 Polyoxyethylated fatty alcohol, Air Products & Chemical Co.
    CF-10 — Benzyl ether of octylphenol ethyleneoxy adduct, Rohm & Haas Co.
    S-25 — Solulan 25, ethylene oxide ether of fractionated lanolin esters, Amerchol Co.
    S-104 — Surfynol 104, 2,4,7,9-tetramethyl-5-decyn-4,7-diol, Air Products Co.
5.  DD — draw down knife blade
    SS — silk screen
6.  The films were subjectively graded by visual and tactual appearance: E - excellent; VG - very good; G - good; F - fair; P - poor.
7.  Color was improved by heating the liquid crystals above their melting temperatures.
8.  MEK — methyl ethyl ketone
    S—C₄OH — sec-butanol
    AmAc — amyl acetate The compositions of the subject invention have numerous advantages and excellent properties. They are easily prepared and handled and provide excellent color in the mesophase of the liquid crystals. In addition, the greasiness of the liquid crystal compositions is sufficiently diminished, so that the liquid crystal film can be readily coated with a wide variety of paints and inks, which form strong permanent bonds to the liquid crystal film. In addition, the laminates, which are formed with the liquid crystal inks of the subject invention, can be readily shaped or formed without breaking of the liquid crystal film, so as to retain the continuous nature of the design or film containing the liquid crystals.

Furthermore, the liquid crystals are fixed in position, so that patterns created in the liquid crystal compositions, are not lost due to migration. The compositions are readily silk screened substantially free or free of bubble formation. The films may be laid down on a wide variety of substrates and may be coated with a wide variety of substrates. In addition, high ratios of the liquid crystal composition can be employed in combination with the polymeric binder, so that intense colors can be achieved with very thin films due to the high proportion of the liquid crystal composition.

The films and laminates have a wide variety of ornamental and utilitarian uses. They can be used for measuring temperature, both as an indication of temperature or as a warning device. In addition, because of deterioration of the cholesteric material by radiation, photographs can be reproduced by irradiating through a negative onto the film. Those areas exposed to the irradiation undergo a change in the temperature response range. Upon the film being warmed in the temperature response range, the photograph is reproduced, so as to be visible. Laminates can be prepared, which can be stretched, blow molded, vacuum molded or the like, while retaining a continuous liquid crystal film.

Although the foregoing invention has been described in some detail by way of illustration and example for purposes of clarity of understanding, it will be obvious that certain changes and modifications may be practiced within the scope of the appended claims.

What is claimed is:

1. A composition useful in the formation of liquid crystal films which comprises:
    a thick oil in water emulsion having from 30 to 80 weight percent solids of which 25–80 weight percent is a cholesteric liquid crystal composition and 75–20 weight percent respectively is a transparent latex forming polymer;
    from 20–70 weight percent liquid having water in from 40–75 weight percent and a moderately water soluble oxygenated organic solvent having a boiling point less than about 175° C for said liquid crystal composition in from 25–60 weight percent; and
    a small but sufficient amount of a thickening agent to provide the desired viscosity for film forming.

2. A composition according to claim 1, wherein said solids content is in the range of 35–60 weight percent, said liquid crystal composition is present in from 40–75 weight percent of said solids content, said polymer is present in from 25–60 weight percent respectively;
    said liquid content is present in from 40–65 weight percent, with water present in from 45–75 weight percent and organic solvent present in from 25–55 weight percent of said liquid content; and
    said thickener is present in from 0.1 to 2 weight percent and including from 0.1 to 2 weight percent of a wetting agent.

3. A composition according to claim 2, wherein said polymer is an acrylic polymer, said solvent is an oxygenated solvent of from 3 to 6 carbon atoms, and said wetting agent is a nonionic emulsifier.

4. A composition according to claim 2, wherein said polymer is a chlorovinyl polymer, said solvent is an oxygenated solvent of from 3 to 6 carbon atoms, and said wetting agent is a nonionic emulsifier.

5. A composition according to claim 2, wherein said solvent is methyl ethyl ketone.

6. A composition according to claim 2, wherein said solvent is a mixture of methyl ethyl ketone and at least one of amyl acetate isobutyl ketone.

7. A liquid crystal composition for forming films of liquid crystals, which is a thick oil in water emulsion comprising:
 35–60 weight percent solids of which 50–75 weight percent is a liquid crystal composition and 25–50 wright percent is a transparent acrylic film-forming polymer;
 40–65 weight percent liquid of which 50–70 weight percent is an organic solvent of at least 50 volume percent methyl ethyl ketone and 30–50 weight percent is water; and
 0.5 to 1.5 weight percent of the total composition of a carboxyvinyl polymeric thickening agent.

8. A composition according to claim 7, having from 0.2 to 4 weight percent of the total composition of a nonionic emulsifier.

9. A method for forming a film-forming liquid crystal composition containing emulsion which comprises:
 forming a mixture of a latex of a transparent film-forming polymer having from about 30–95 weight percent water, a solution of a liquid crystal composition in a moderately water soluble oxygenated organic solvent having a boiling point below about 175° C, and from about 0.1–2 weight percent of the total composition of a thickening agent, said liquid crystal composition being present in an amount to provide 25–80 weight percent of the total solids content, wherein said solution is at a temperature in the range of about 40°–100° C; and
 stirring the resulting mixture for a time sufficient to provide a substantially uniform composition.

10. A film of at least about 0.5 mil thickness prepared from a composition according to claim 1.

11. A film of at least about 0.5 mil thickness prepared from a composition according to claim 3.

12. A film of at least about 0.5 mil thickness prepared from a composition according to claim 4.

13. A laminate comprising a thin transparent film, having as one layer a film of at least about 0.5 mil thickness prepared from a composition according to claim 1 and as a second layer a black pigmented film backing.

14. A laminate according to claim 13, wherein said laminate is vacuum formable.

15. A laminate according to claim 13, wherein said laminate is blow moldable.

16. A laminate according to claim 13, wherein said laminate is elastomeric.

17. A laminate according to claim 13, including a heat-conducting film backing.

18. A laminate according to claim 13, wherein said liquid crystal composition is present in from 40–65 weight percent of said solids content.

* * * * *